United States Patent
Titi et al.

(10) Patent No.: US 10,331,705 B2
(45) Date of Patent: Jun. 25, 2019

(54) MOMENTS NAMING BASED ON LOCATION ACCURACY

(71) Applicant: APPLE INC., Cupertino, CA (US)

(72) Inventors: Justin Titi, Cupertino, CA (US); Nicholas J. Woods, San Francisco, CA (US); Patrick Kelly, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 272 days.

(21) Appl. No.: 15/072,186

(22) Filed: Mar. 16, 2016

(65) Prior Publication Data

US 2016/0357785 A1 Dec. 8, 2016

Related U.S. Application Data (60) Provisional application No. 62/172,194, filed on Jun. 7, 2015.

(51) Int. Cl.
*G06F 16/28* (2019.01)
*G06F 16/29* (2019.01)
*G06F 16/58* (2019.01)

(52) U.S. Cl.
CPC ............ *G06F 16/285* (2019.01); *G06F 16/29* (2019.01); *G06F 16/58* (2019.01)

(58) Field of Classification Search
CPC ......... G06F 17/30598; G06F 17/30241; G06F 17/30265; G06F 16/285; G06F 16/58; G06F 16/29
See application file for complete search history.

(56) References Cited

U.S. PATENT DOCUMENTS

| | | | |
|---|---|---|---|
| 8,150,098 B2 | 4/2012 | Gallagher et al. | |
| 8,311,556 B2 | 11/2012 | Wang et al. | |
| 9,111,143 B2 | 8/2015 | Meredith et al. | |
| 2001/0044795 A1* | 11/2001 | Cohen | G06F 17/30699 |
| 2003/0037034 A1* | 2/2003 | Daniels | G06Q 10/087 |
| 2005/0055357 A1* | 3/2005 | Campbell | G06F 8/61 |
| 2008/0064438 A1 | 3/2008 | Calvet et al. | |
| 2009/0325603 A1* | 12/2009 | Van Os | H04W 4/02 455/456.2 |

(Continued)

OTHER PUBLICATIONS

Naaman et al. "Automatic organization for digital photographs with geographic coordinates," JCDL'04, Jun. 7-11, 2004, Tucson, Arizona, USA (Year: 2004).*

(Continued)

*Primary Examiner* — Jay A Morrison
(74) *Attorney, Agent, or Firm* — Invoke (57) ABSTRACT

In some implementations, a computing device can automatically name moments (e.g., a time-based collections of images) based on the accuracy of the location data corresponding to the captured image. The computing device can, for example, send location coordinates for an image associated with a moment to a location server. The computing device can receive a hierarchical list of location strings corresponding to the location coordinates from the location server. The computing device can filter the location strings based on an accuracy metric associated with the location coordinates for the image. The computing device can suggest or select a name for the collection of images based on the filtered location strings.

21 Claims, 10 Drawing Sheets

(56) References Cited

U.S. PATENT DOCUMENTS

2014/0137011 A1* 5/2014 Matas ............... G06Q 10/10
715/764
2015/0363640 A1* 12/2015 Meyer ............... G06Q 10/10
382/224

OTHER PUBLICATIONS

Cheng et al., "You are where you tweet a content-based approach to geo-locating twitter users," Proceedings of the 19th ACM international conference on Information and knowledge management, ACM, 2010. (Year: 2010).*

* cited by examiner

<​Collections   Moments   🔍 Select — 180

East Palo Alto – The Willows  Share
University Ave >  May 28

| 112 | 114 | 116 | 118 |
| 120 | 122 | 124 | |

— 110

Malakoff Diggings St Hist Park  Share
Nevada City, CA >  May 30

| 132 | 134 | 136 | 138 |

— 130

Cupertino & East Palo Alto  Share
California >  Monday

| 152 | 154 | 156 | 158 |
| 160 | | | |

| Edit Location | Select Items | Cancel |

East Palo Alto – The Willows
University Ave > — Select May 28

112 | 114 | 116 | 118
120 | 122 | 124 | 126

Malakoff Diggings St Hist Park
Nevada City, CA > — Select May 30

132 | 134 | 136 | 138

Cupertino & East Palo Alto
California > — Select Monday

MOMENTS NAMING BASED ON LOCATION ACCURACY

CROSS-REFERENCE TO RELATED APPLICATIONS

This application claims priority to U.S. Provisional Application Ser. No. 62/172,194, filed Jun. 7, 2015, which is hereby incorporated by reference herein in its entirety.

TECHNICAL FIELD

The disclosure generally relates to managing collections of media items.

BACKGROUND

Modern computing devices often include features for capturing and managing images. For example, most computing devices (e.g., smartphones, tablet computers, laptop computers, etc.), include a camera, a camera application, and/or a photo management application. When a user uses a computing device to capture images (e.g., with the camera and camera application), the computing device can store the image and the user can view, edit, and/or otherwise manipulate the captured image with the image management application.

SUMMARY

In some implementations, a computing device can automatically name moments (e.g., a time-based collection of images) based on the accuracy of the location data corresponding to the captured image. The computing device can, for example, send location coordinates for an image associated with a moment to a location server. The computing device can receive a hierarchical list of location strings corresponding to the location coordinates from the location server. The computing device can filter the location strings based on an accuracy metric associated with the location coordinates for the image. The computing device can suggest or select a name for the collection of images based on the filtered location strings.

Particular implementations provide at least the following advantages: a computing device can identify location strings (e.g., names) most appropriate for an image based on the accuracy of a location estimate generated for the image; the computing device can automatically suggest locations based on the location accuracy to help the user identify the appropriate location for a corresponding image; and the computing device can suggest or select a name for a collection of images that most accurately reflects the places associated with the collection.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Figure 1:
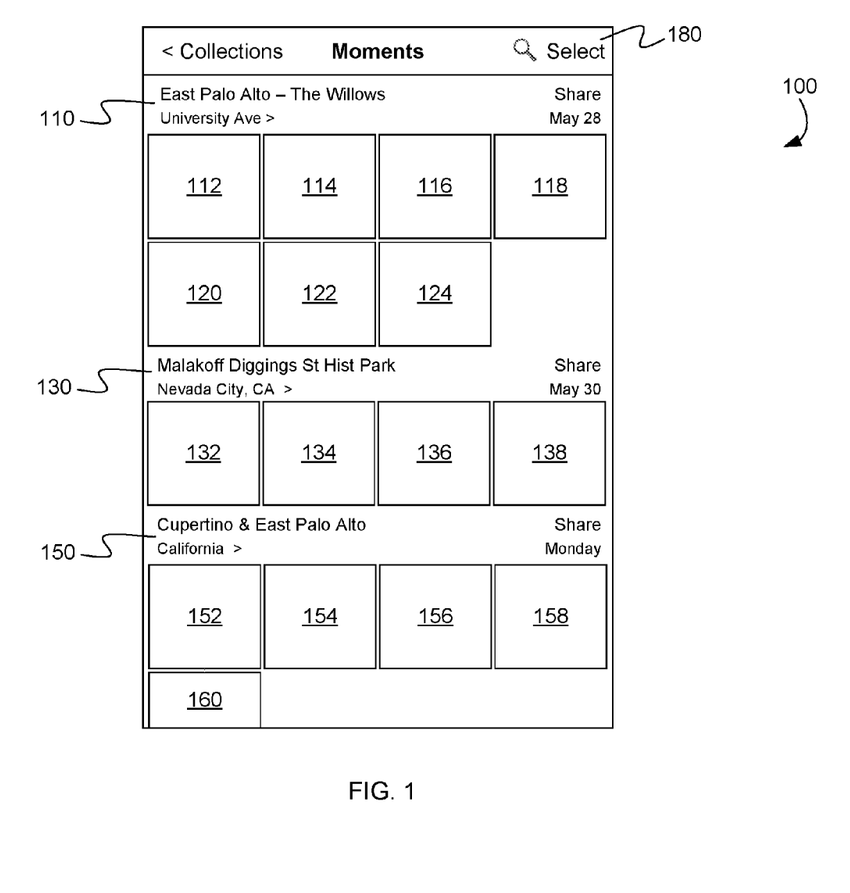
FIG. 1 illustrates an example graphical user interface for viewing images on a computing device.

FIG. 1 illustrates an example graphical user interface 100 for viewing images on a computing device. For example, GUI 100 can provide an interface for viewing time-based collections of images (e.g., moments). For example, a user can use a computing device to capture images (e.g., photographs). The computing device can capture an image (e.g., using a camera and/or camera application) and generate metadata for the image that identifies the time (e.g., a timestamp identifying date and time) when the photograph was taken and the location (e.g. global navigation satellite system coordinates, geographic coordinates, etc.) where the photograph was taken. The computing device can store the captured image and metadata in an image repository (e.g., image library on the computing device.

In some implementations, the computing device can include an image management application. For example, the image management application can provide various GUIs for organizing and presenting images in the image library to the user. In some implementations, the image management application can organize images in the image library into "moments." For example, a moment can be a time-based collection of images. Images that were captured within a period of time (e.g., a day, a few hours, etc.) can be grouped into a moment, for example. The computing device can, for example, compare the timestamp of an image to timestamps of other images to determine when the images were captured and whether the images should be grouped together.

In some implementations, GUI 100 can include moments 110, 130 and 150. For example, images 112, 114, 116, 118, 120, 122, and 124 may have all been captured on the same day (e.g., May 28). The computing device can recognize the temporal proximity of the timestamps of each image 112, 114, 116, 118, 120, 122, and 124 and group the images together into moment 110. The computing device can analyze the location information associated with images 112, 114, 116, 118, 120, 122, and 124 to generate a name or names for moment 110. For example, moment 110 can include images captured in East Palo Alto, Calif. Thus, the computing device can name moment 110 using the location name "East Palo Alto."

Similarly, images 132, 134, 136, and 138 may have all been captured on the same day (e.g., May 30). The computing device can recognize the temporal proximity of the timestamps of each image 132, 134, 136, and 138 and group the images together into moment 130. The computing device can analyze the location information associated with images 132, 134, 136, and 138 to generate a name or names for moment 130. For example, moment 130 can include images captured in Malakoff Diggings State Historic Park near Nevada City, Calif. Thus, the computing device can name moment 130 using the location names "Malakoff Diggings State Historic Park" and "Nevada City, Calif."

Likewise, images 152, 154, 156, 158, and 160 may have all been captured on the same day (e.g., Monday). The computing device can recognize the temporal proximity of the timestamps of each image 152, 154, 156, 158, and 160 and group the images together into moment 150. The computing device can analyze the location information associated with images 152, 154, 156, 158, and 160 to generate a name or names for moment 150. For example, moment 150 can include images captured in Cupertino, Calif. and East Palo Alto, Calif. Thus, the computing device can name moment 150 using the location names "Cupertino" and "East Palo Alto."

In some implementations, the computing device can select a name or names for a moment based on the location accuracy metric describing the accuracy of the location estimate associated with an image. For example, when the computing device determines the GNSS (global navigation satellite system) location estimate (e.g., geographic coordinates) for where the image was captured, the computing device can also determine how accurate the location estimate is and generate a location accuracy metric to describe the location accuracy. For example, the location accuracy metric can identify a radius distance from the GNSS location. The radius distance can be used to determine a circular area around the GNSS location in which the actual location of the computing device is likely to be.

Figure 2:
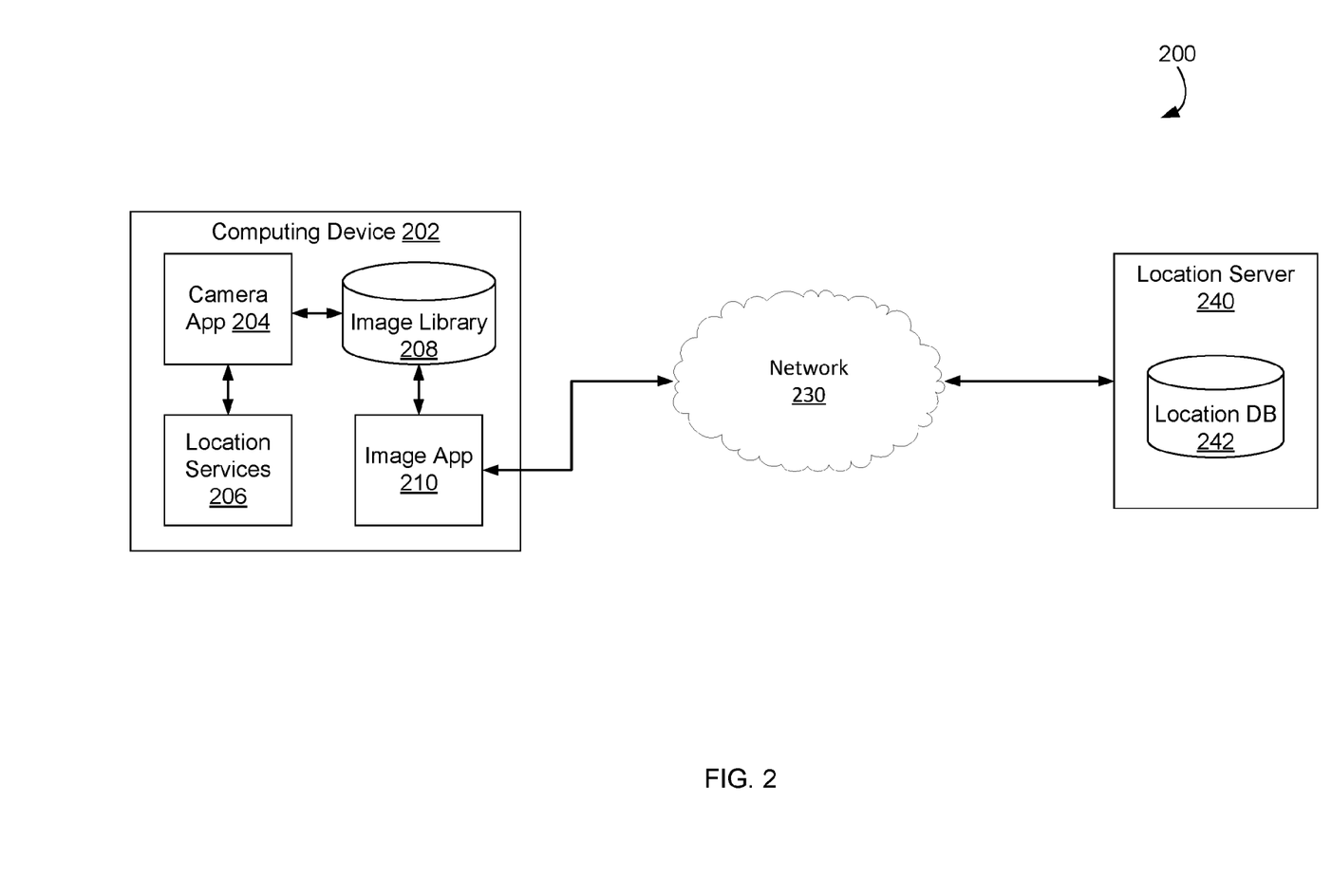
FIG. 2 is a block diagram of an example system for moments naming based on location accuracy.

FIG. 2 is a block diagram of an example system 200 for moments naming based on location accuracy. In some implementations, system 200 can include computing device 202. For example, computing device 202 can be a smartphone, tablet computer, or any other computing device that is configured to capture and manage images.

In some implementations, computing device 202 can include camera application 204. For example, camera application 204 can provide a user interface to a camera (camera subsystem 1020 and an optical sensor 1022 of FIG. 10) for capturing images. A user can interact with camera application 204 to capture an image with the camera.

In some implementations, camera application 204 can tag captured images with time metadata. For example, upon capturing an image, camera application 204 can generate metadata (e.g., a timestamp) describing the date and/or time when the image was captured.

In some implementations, camera application 204 can tag captured images with location metadata. For example, upon capturing an image, camera application 204 can send a request to location services 206 for the current location of computing device 202. For example, location services 206 can be an operating system process that can collect location signals (e.g., GNSS signals, cellular transmitter signals, Wi-Fi signals, etc.) and determine an estimate of the current geographic location (e.g., geographic coordinates) for computing device 202. In some implementations, location services 206 can estimate the accuracy of the location estimate. For example, location services 206 may be able to determine the location accuracy based on the type and quality of signals received from various GNSS, cellular, and/or Wi-Fi signal sources. Location services 206 can return the current geographic location to camera application 204 and camera application 204 can generate location metadata that includes the current geographic location of computing device 202.

In some implementations, camera application 204 can store the captured image and image metadata in image library 208. For example, image library 208 can be a repository of images (e.g., photos) stored on computing device 208. Images and corresponding image metadata can be stored together in image library 208 so that the images and respective image metadata can be later retrieved by other applications on computing device 202.

In some implementations, computing device 202 can include image application 210. For example, image application 210 can be an image management application similar to the image management application described above with reference to FIG. 1. In some implementations, image application 210 can be configured to generate moments GUI 100 of FIG. 1. For example, image application 210 can obtain images from image library 208. Image application 210 can analyze the timestamps of the images to group the images into moments, as described above. Image application 210 can obtain the location estimates for images in the moments groupings and send the location estimates (e.g., GNSS coordinates) to location server 240 through network 230 (e.g., the internet).

In some implementations, location server 240 can generate a list of location strings (e.g., labels) based on the location estimates received from image application 210. For example, location server 240 can maintain location database 242. Location database 242 can store a mapping of location coordinates to location strings. For example, each location coordinate can be associated with a corresponding hierarchical collection of location strings. Each hierarchical collection of location strings can, for example, include location labels for different geographic levels corresponding to the size of the geographic area associated with the label. For example, the location coordinates can correspond to a hierarchy of location labels such as a street address (small area), a neighborhood name (larger area), a city name (big area), a state name (bigger area), etc. The location labels can include names of significant landmarks, areas of interest, or other labels that might be meaningful to a user.

In some implementations, upon receiving the location estimates from image application 210, location server 240 can query location database 242 for the list of location strings (labels) for each estimated location. Location server 240 can generate location label information that includes the list of location strings and a geographic level for each string in the geographic hierarchy. Location server 240 can return the location label information to image application 210.

In some implementations, image application 210 can generate a name for a moment grouping based on label information received from location server 240. For example, image application 210 can analyze the location strings in the label information to determine common or frequently occurring strings (labels) amongst the image in a moment grouping. Image application 210 can then assign a name to the moment's grouping based on the (e.g., 1, 2, 3, etc.) most common location strings.

In some implementations, image application 210 can filter the location strings for an image based on the location accuracy metric associated with the image. As described above, each image can be tagged with an estimated location (e.g., geographic coordinates) and a location accuracy metric indicating the determined accuracy of the estimated location. Image application 210 can use this location accuracy metric to filter the location strings associated with the estimated location received from location server 240, as described with reference to FIG. 3 below. Image application 210 can then select a name or names for the moment grouping based on the remaining location strings that have not been filtered out.

Figure 3:
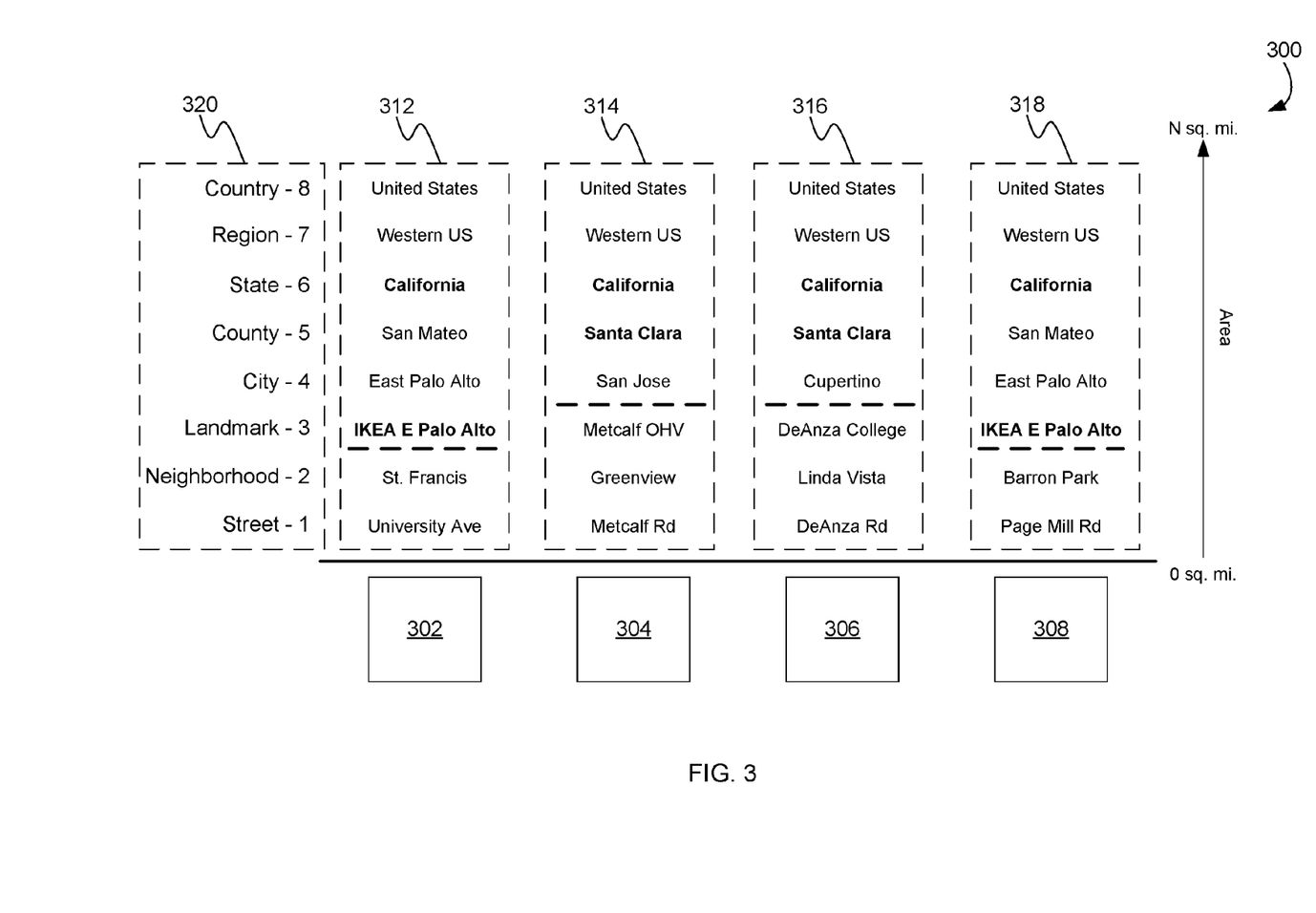
FIG. 3 is a diagram depicting an example of filtering location strings based on location accuracy.

FIG. 3 is a diagram 300 depicting an example of filtering location strings based on location accuracy. As described above, image application can receive location label information (e.g., location strings and corresponding geographic levels) for each image in a moments image grouping from location server 240. For example, diagram 300 shows four images (image 302, image 304, image 306, and image 308) from a moments image grouping. The image grouping can have more than four images, for example. Each image can be associated with location strings (geographic labels of places) based on the estimated location of each image. For example, image 302 can be associated with location strings 312. Image 304 can be associated with location strings 314. Image 306 can be associated with location strings 316. Image 308 can be associated with location strings 318. In some implementations, the location strings can be associated with geographic levels 320. For example, the street geographic level can correspond to geographic level 1. The city geographic level can correspond to geographic level 2.

In some implementations, image application 210 can determine a threshold level for the image strings for each image based on the accuracy of the location estimate for each image. For example, if the location estimate for image 302 has a location accuracy corresponding to a neighborhood (e.g., 0.5 mile radius), image application can set the threshold level (horizontal bold dashed line) to the geographic level above neighborhood (e.g., level 2) so that location labels corresponding to areas smaller than the location accuracy metric will be filtered out (e.g., removed from) the list of location strings 312. If the location estimate for image 304 has a location accuracy corresponding to a landmark (e.g., 2 mile radius), image application can set the threshold level (horizontal bold dashed line) to the geographic level above landmark (e.g., level 3) so that location labels corresponding to areas smaller than the location accuracy metric will be filtered out (e.g., removed from) the list of location strings 314.

In some implementations, after the location strings are filtered based on the location accuracy metric, image application 210 can select a name or names for the moment grouping based on the remaining location strings. For example, image application 210 can analyze the location strings above the threshold levels (horizontal bold dashed lines) in each location string list (e.g., lists 312, 314, 316, 318) to determine which location strings are most common. For example, image application 210 can determine that the location string "IKEA E Palo Alto" is a common string since it appears twice. Image application can determine that the location strings "East Palo Alto," "Santa Clara," "San Mateo," and "California" are all common strings since they appear two or more times.

In some implementations, image application 210 can be configured to prefer location strings at lower geographic levels over location strings at higher geographic levels. For example, image application can be configured to select "IKEA E Palo Alto" instead of "California" because "IKEA E Palo Alto" corresponds to a lower geographic level and is, therefore, a more accurate label. In some implementations, image application 210 can select labels that represent all or most of the images in a moments grouping. For example, "IKEA E Palo Alto" might be a good label for images 302 and 308 but might not be a good label for images 304 and 306 because images 304 and 306 do not have the string "IKEA E Palo Alto" included in their respective location string lists 314 and 316. Thus, image application 210 can select the "IKEA E Palo Alto" label to represent images 302 and 308 and the "Santa Clara" label to represent images 304 and 306. Similarly, if there was an image that only shared a common label at the state level, then image application 210 can select the state level label (e.g., "California") as part of the name for the moments image grouping. Thus, image application 210 can generate a name for the moments image grouping that includes "IKEA E Palo Alto," "Santa Clara," and "California." For example, the moments grouping can be named "IKEA E Palo Alto & Santa Clara County—California" similar to moments grouping 150 of FIG. 1.

Figure 4:
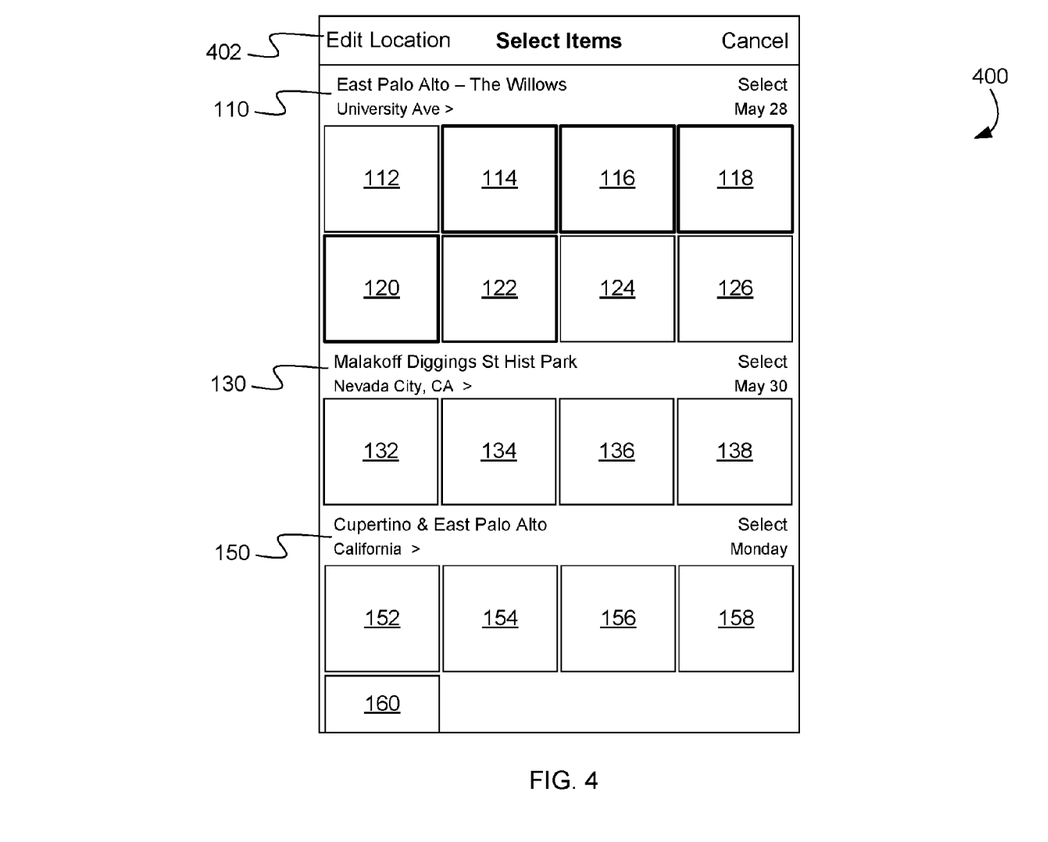
FIG. 4 illustrates an example graphical user interface for selecting an image from a moments grouping.

FIG. 4 illustrates an example graphical user interface 400 for selecting an image from a moments grouping. For example, GUI 400 can be similar to GUI 100 of FIG. 1. Image application 210 can present GUI 400 in response to receiving a user input selecting graphical element 180 of FIG. 1, for example. After the user selects the "select" graphical element 180, image application can cause the images presented on GUI 400 to become selectable. For example, a user can provide input to GUI 400 to select to edit the locations associated with image 114, image 116, image 118 and/or image 120. After the image or images are selected, the user can select graphical element 402 to invoke GUI 500 of FIG. 5 so that the user can edit the location of the selected images.

Figure 5:
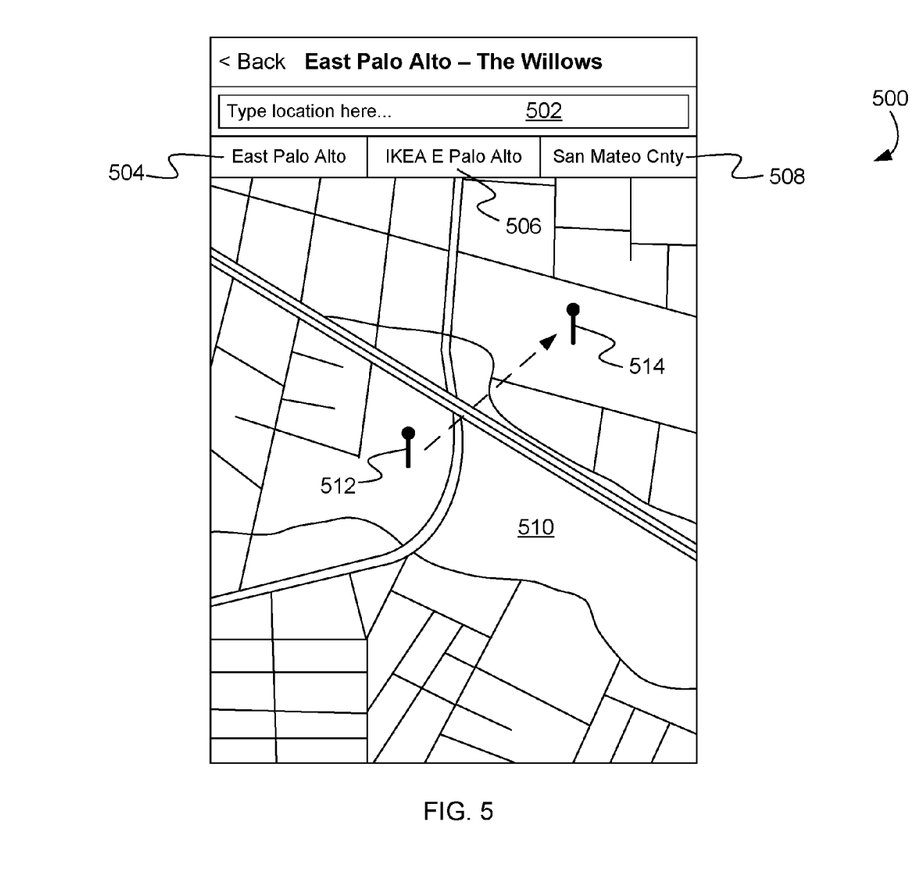
FIG. 5 illustrates an example graphical user interface for editing a location of an image.

FIG. 5 illustrates an example graphical user interface 500 for editing a location of an image. For example, image application 210 can present GUI 500 in response to receive user input selecting graphical element 402 of FIG. 4. For example, after the user selects images for location editing using GUI 400, the user can specify a new location for the selected images using GUI 500.

In some implementations, GUI 500 can receive text input from the user specifying a new location for the selected images. For example, GUI 500 can present graphical element 502 (e.g., a text input box). A user can select graphical element 502 to invoke a virtual keyboard. The user can type characters using the virtual keyboard and the characters can be displayed on graphical element 502 as text input.

In some implementations, image application 210 can present location suggestions on GUI 500. For example, upon receiving the selection of graphical element 502 and/or while GUI 500 is receiving the text input, image application 210 can present location suggestions. For example, graphical elements 504, 506, and/or 508 (e.g., suggestion boxes, automatic completion boxes, etc.) can present location strings (labels) suggestions.

In some implementations, the location string suggestions presented on GUI 500 can be based on the hierarchical location string lists received from location server 240. For example, each of the images selected using GUI 400 can have corresponding location information (e.g., geographical coordinates, location accuracy metric, etc.). As described above, when generating the moments image grouping to which the selected images belong, image application 210 will have requested and received the hierarchical location string lists from location server 240. The location strings suggestions displayed on graphical elements 504, 506, and/or 508 can be selected from the hierarchical location string lists corresponding to the selected images.

In some implementations, the location string suggestions can be generated based on filtered hierarchical location string lists. For example, image application 210 can filter the hierarchical location string lists as described with reference to FIG. 3 and select the location string suggestions based on the filtered hierarchical location string lists. The user can select a suggested location string to assign a new location to the selected images. The user can complete typing another location string and enter the location string to assign a new location to the selected image.

In some implementations, the location string suggestions can be based on the characters of the user's text input. For example, image application 210 can match the sequence of characters of the user's text input to the sequence of characters in the filtered location strings. If a character sequence in the text input matches (e.g., corresponds) to a sequence of characters in a location string, then image application 210 can suggest the matching location string from the filtered location string list.

In some implementations, image application 210 can determine a new location accuracy metric for the newly assigned location. For example, image application 210 can determine the new location accuracy metric based on the geographic level associated with the user specified location string. If the user selects a suggested location string, image application 210 can determine the level of the suggested location string from the location string information received from location server 240. If the user does not select a suggested location string, image application 210 can send the user's typed location to location server 140. In response to receiving the typed location string, location server 240 can return location information identifying geographic coordinates and location string information for the typed location to image application 210. Image application 210 can determine new location coordinates and a new location accuracy metric for the typed location based on the location information received from the server. Image application 210 can then store the new location coordinates, the new location accuracy metric, and the hierarchical location string lists in image library 208 as metadata for the respective images.

In some implementations, GUI 500 can include an interactive map for specifying a new location for selected images. For example, interactive map 510 can identify a location associated with the selected images using graphical element 512 (e.g., a pin, a flag, some marker, etc.). When the user wishes to edit the location associated with the selected images, the user can drag graphical element 512 to another location on interactive map 510, as represented by graphical element 514. Once the new location is identified on interactive map 510, image application 210 can determine the location coordinates corresponding to the location of graphical element 514.

In some implementations, image application 210 can determine the location accuracy for the new location based on the zoom level of interactive map 510. For example, if the zoom level of interactive map 510 shows an area 6 miles across, then the accuracy metric for the new location can be set to 3 miles radius (e.g., diameter of 6=radius of 3). If the zoom level of interactive map 510 is at the city level, then the accuracy metric for the new location can be set to a radius distance corresponding to the city level.

In some implementations, after image application 210 determines the location coordinates and the accuracy metric for the new location of graphical element 514, image application can send the new location coordinates to location server 240. Location server can respond by sending the hierarchical location strings to image application 210. In response to receiving the hierarchical location strings, image application 210 can revise the name of the moments grouping based on the received hierarchical location strings and the new accuracy metric according to the techniques described above.

Example Processes

Figure 6:
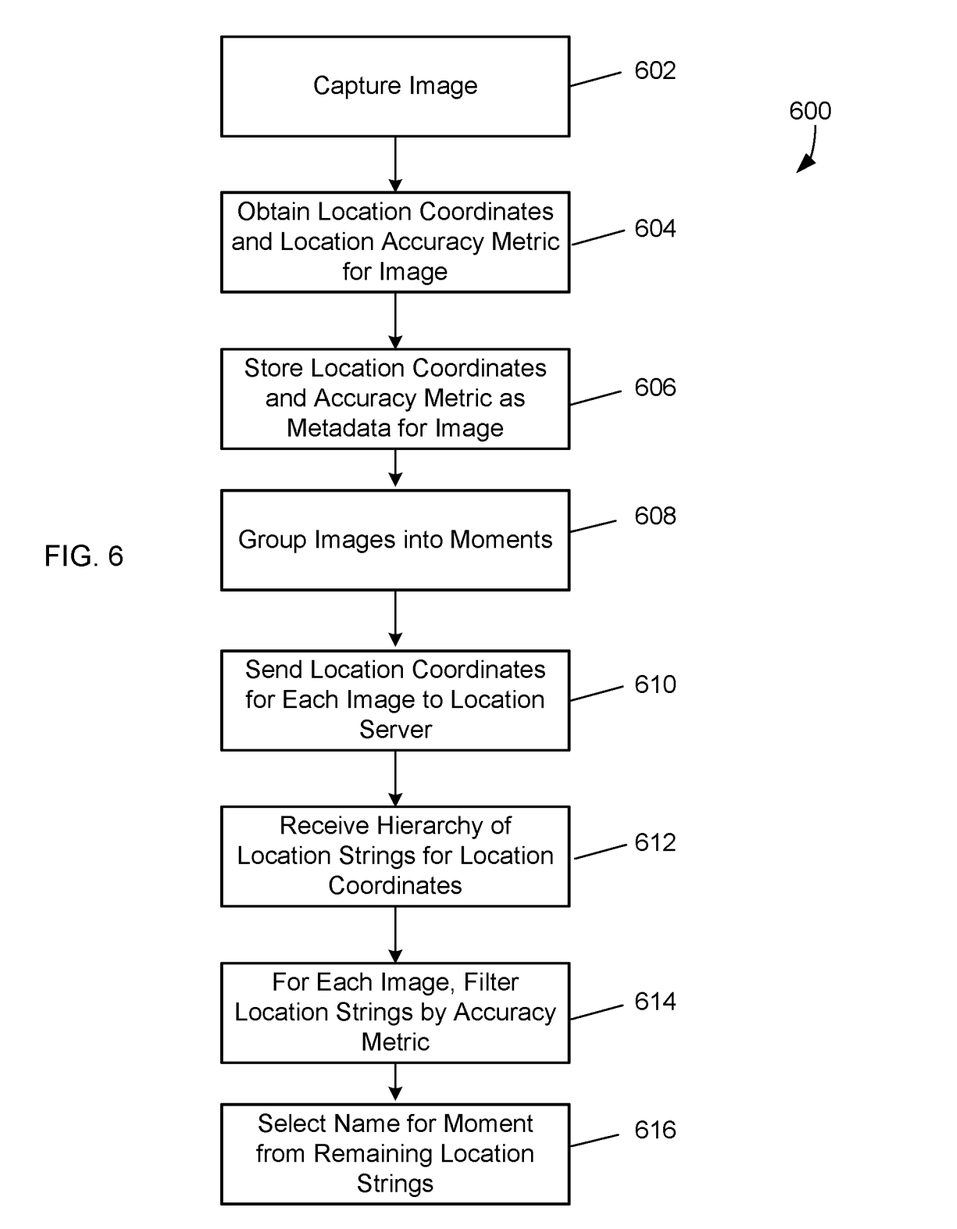
FIG. 6 is a flow diagram of an example process for moments naming based on location accuracy.

FIG. 6 is flow diagram of an example process 600 for moments naming based on location accuracy. At step 602, a computing device can capture an image. For example, the computing device can capture the image using a camera and/or camera application configured on the computing device, as described above.

At step 604, the computing device can obtain location coordinates and a location accuracy metric for the captured image. For example, the computing device can determine the estimated location coordinates and location accuracy for the captured image based on GNSS, cellular, and/or Wi-Fi signals received by the computing device, as described above At step 606, the computing device can store the location coordinates and accuracy metric as metadata for the captured image. For example, the computing device can store a timestamp for the image, the location coordinates for the image, and/or the location accuracy metric for the image in an image library on the computing device, as described above.

At step 608, the computing device can group images in the image library into moments. For example, a moment can be a time-based grouping of images, as described above. The computing device can generate the moments grouping based on the timestamp stored for each image.

At step 610, the computing device can send the location coordinates for each image in the moments grouping to a location server. For example, the location server can generate a hierarchical list of location strings for the location coordinates of each image. The location server can send the list of location strings and geographic levels for each image to the computing device.

At step 612, the computing device can receive the hierarchy of location strings corresponding to the location coordinates of the respective images in the moments grouping. For example, the computing device can receive the location string and geographic level information from the location server, as described above.

At step 614, the computing device can filter the location strings for each respective image based on the location accuracy metric for the corresponding image. For example, the computing device can filter the location strings according to the description of FIG. 3.

At step 616, the computing device can select a name for the moments image grouping based on the remaining location strings in the filtered lists of strings. For example, the computing device can select a name for the moments grouping based on the remaining strings from the filtered lists of location strings.

Figure 7:
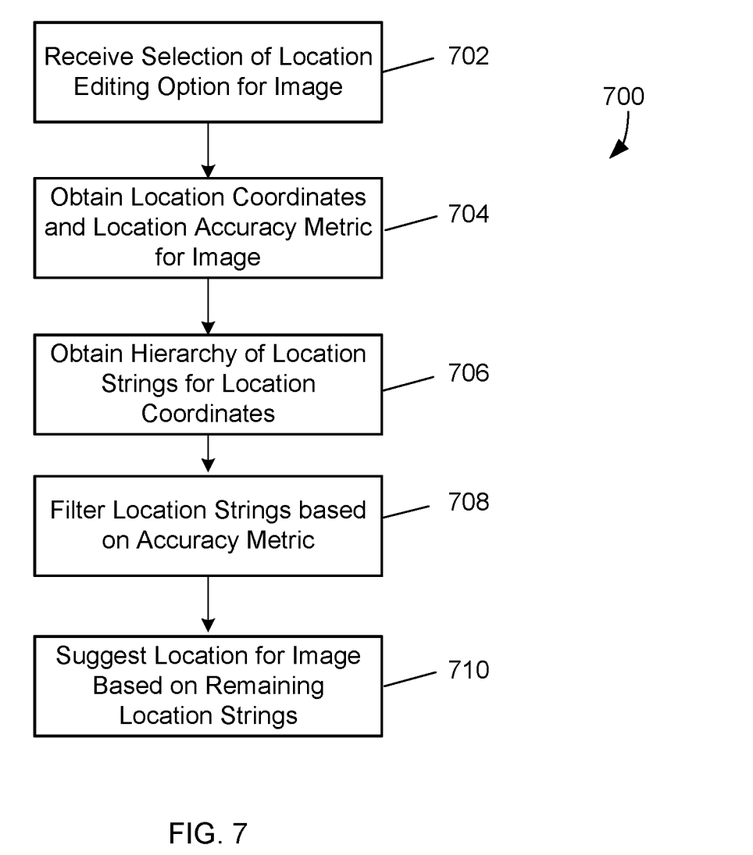
FIG. 7 is a flow diagram of an example process for suggesting a location based on location accuracy.

FIG. 7 is a flow diagram of an example process 700 for suggesting a location based on location accuracy. At step 702, a computing device can receive a selection of a location editing option for an image. For example, a user can select images for which the user wishes to edit the image's currently assigned locations using GUI 400 of FIG. 4.

At step 704, the computing device can obtain location coordinates and an accuracy metric for the selected image. For example, the computing device can obtain the location coordinates and the accuracy metric from an image library on the computing device, as described above.

At step 706, the computing device can obtain a hierarchical location string list corresponding to the location coordinates obtained at step 704. For example, the computing device can obtain the hierarchical location string list from the image library stored on the computing device. The computing device can obtain the hierarchical location string list from a location server, as described above. When the computing device obtains the hierarchical string list from the location server, the computing device can store the hierarchical location string list in the image library as metadata for the corresponding image.

At step 708, the computing device can filter the hierarchical location strings based on the accuracy metric obtained at step 704. For example, the computing device can filter the hierarchical location strings according to the description of FIG. 3.

At step 710, the computing device can suggest a new location for the image based on the remaining location strings. For example, after the computing device filters the hierarchical location strings based on the accuracy metric, the computing device can suggest a new location to assign to the image based on the remaining hierarchical location strings in the filtered lists, as described above with reference to FIG. 5.

Figure 8:
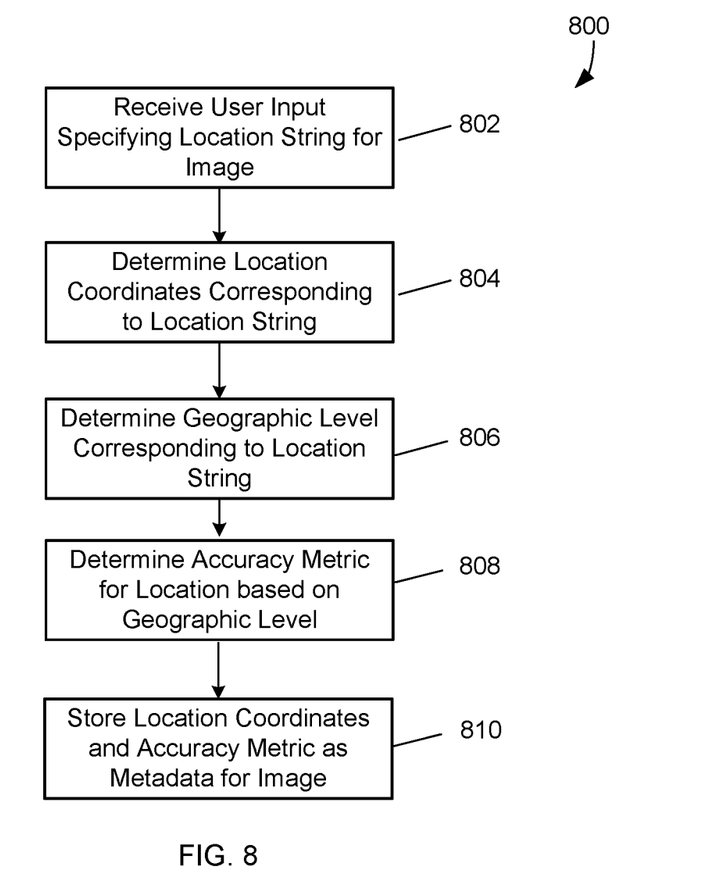
FIG. 8 is a flow diagram of an example process for determining a location accuracy metric for a user-specified location string.

FIG. 8 is a flow diagram of an example process 800 for determining a location accuracy metric for a user-specified location string. At step 802, a computing device can receive user input specifying a location string for an image. For example, the user can specify the new location string by providing text input to GUI 500 of FIG. 5.

At step 804, the computing device can determine location coordinates corresponding to the user-specified location string. For example, the computing device can send the user-specified location string to a location server. The location server can return geographic coordinates and a hierarchical list of location strings for the user-specified location string, as described above.

At step 806, the computing device can determine a geographic level corresponding to the user-specified location string. For example, the computing device can determine the geographic level of the user-specified location string by comparing the user-specified location string to the hierarchical location string list, determining a string in the hierarchical location string list that corresponds to (e.g., matches) the user-specified string, and determining at which geographic level in the geographic hierarchy the corresponding string exists.

At step 808, the computing device can determine an accuracy metric for the user-specified location based on the geographic level determined at step 806. For example, the location accuracy metric can be determined based on the geographic area associated with the geographic level, as described above.

At step 810, the computing device can store the location coordinates and the accuracy metric determined for the user-specified location string as metadata for the image. For example, the location coordinates and the accuracy metric can be stored in the image library of the computing device.

Figure 9:
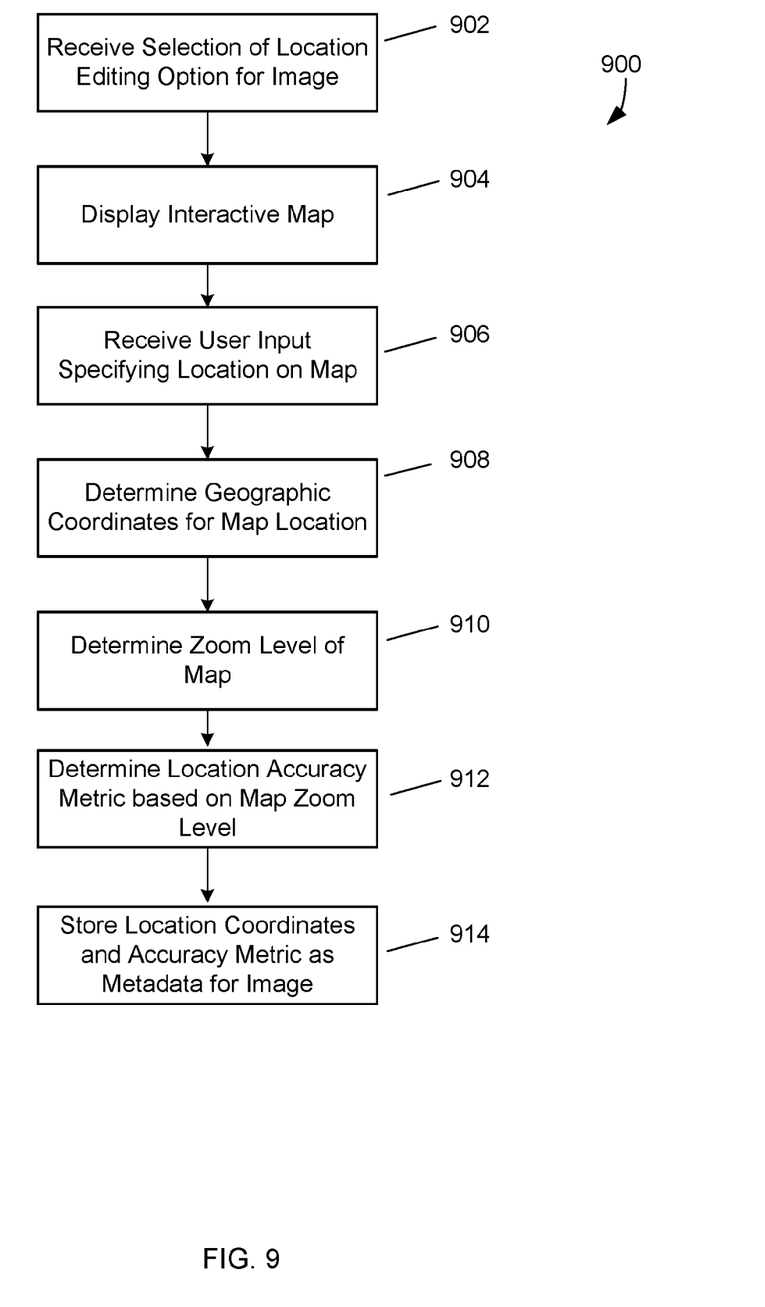
FIG. 9 is a flow diagram of an example process for determining a location accuracy metric for a user-specified map location.

FIG. 9 is a flow diagram of an example process 900 for determining a location accuracy metric for a user-specified map location. At step 902, the computing device can receive a selection of a location editing option for an image. For example, the user can select one or more images using GUI 400. The user can select to edit the location of the image(s) by selecting graphical element 402 of FIG. 4.

At step 904, the computing device can display an interactive map. For example, the computing device can display the interactive map described with reference to GUI 500 of FIG. 5.

At step 906, the computing device can receive user input specifying a location on the interactive map. For example, the user can drag and/or drop a pin or other graphical element on the interactive map of GUI 500 to specify a new location for the selected images.

At step 908, the computing device can determine the geographic coordinates for the specified map location. For example, the computing device can store geographic coordinate information (e.g., map tiles) for the displayed map on the computing device and determine the geographic coordinates for the specified map location based on the stored geographic coordinate information. Alternatively, the computing device can request and receive geographic coordinates for the specified map location from a remote map server.

At step 910, the computing device can determine the zoom level of the interactive map. For example, the computing device can determine an area presented by the interactive map when the user input specifying the location on the interactive map was received.

At step 912, the computing device can determine the location accuracy metric based on the zoom level of the map. For example, if the map zoom level corresponds to an area that is 2 miles across (e.g., horizontally, vertically, etc.), then the computing device can determine the location accuracy to be a 1 mile radius, for example.

At step 914, the computing device can store the location coordinates and location accuracy metric as metadata for the image. For example, the computing device can store the location coordinates and the location accuracy metric in the image library on the computing device.

Example System Architecture

Figure 10:
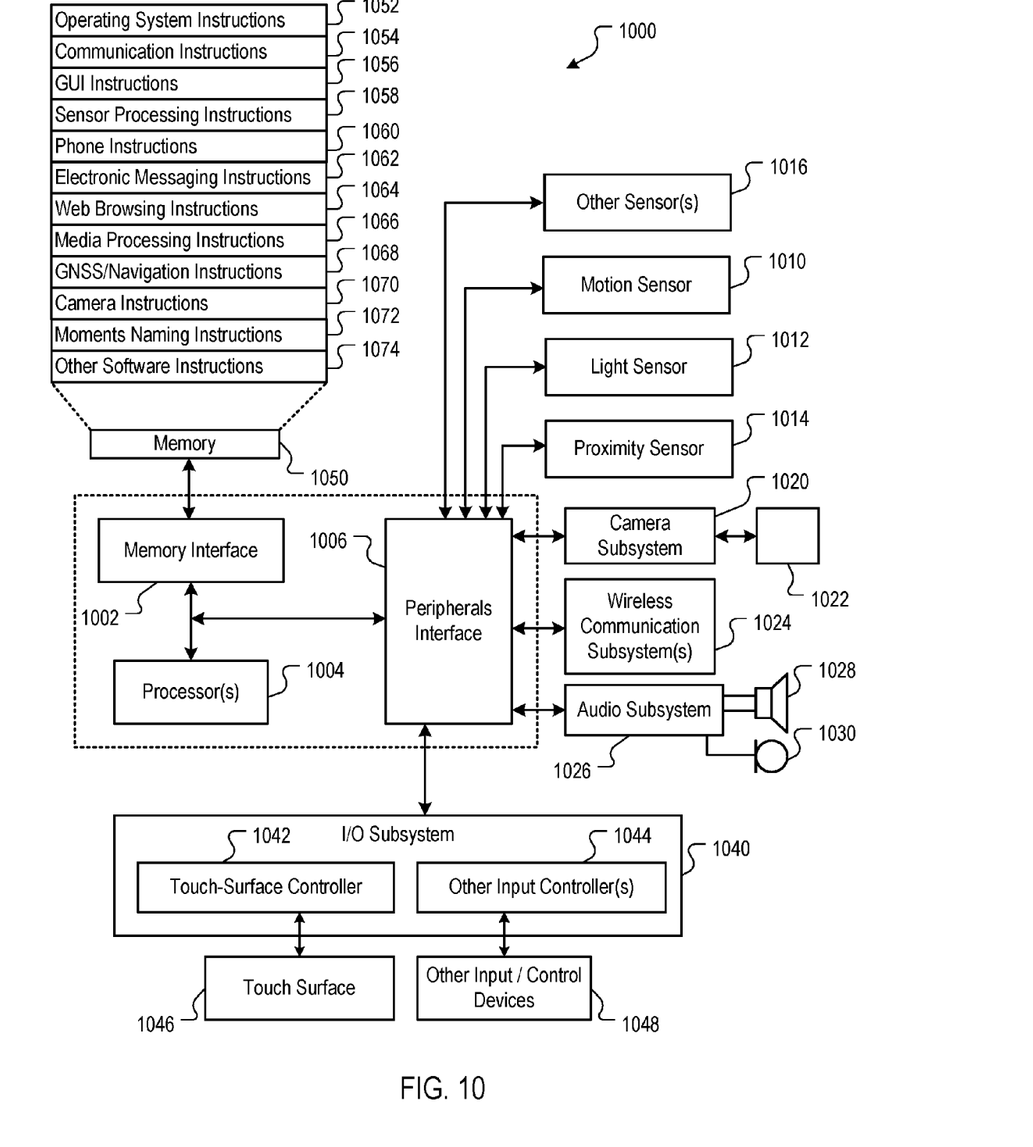
FIG. 10 is a block diagram of an example computing device that can implement the features and processes of FIGS. 1-9.

FIG. 10 is a block diagram of an example computing device 1000 that can implement the features and processes of FIGS. 1-9. The computing device 1000 can include a memory interface 1002, one or more data processors, image processors and/or central processing units 1004, and a peripherals interface 1006. The memory interface 1002, the one or more processors 1004 and/or the peripherals interface 1006 can be separate components or can be integrated in one or more integrated circuits. The various components in the computing device 1000 can be coupled by one or more communication buses or signal lines.

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate orientation, lighting, and proximity functions. Other sensors 1016 can also be connected to the peripherals interface 1006, such as a global navigation satellite system (GNSS) (e.g., GPS receiver), a temperature sensor, a biometric sensor, magnetometer or other sensing device, to facilitate related functionalities.

A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips. The camera subsystem 1020 and the optical sensor 1022 can be used to collect images of a user to be used during authentication of a user, e.g., by performing facial recognition analysis.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which the computing device 1000 is intended to operate. For example, the computing device 1000 can include communication subsystems 1024 designed to operate over a GSM network, a GPRS network, an EDGE network, a Wi-Fi or WiMax network, and a Bluetooth™ network. In particular, the wireless communication subsystems 1024 can include hosting protocols such that the device 100 can be configured as a base station for other wireless devices.

An audio subsystem 1026 can be coupled to a speaker 1028 and a microphone 1030 to facilitate voice-enabled functions, such as speaker recognition, voice replication, digital recording, and telephony functions. The audio subsystem 1026 can be configured to facilitate processing voice commands, voiceprinting and voice authentication, for example.

The I/O subsystem 1040 can include a touch-surface controller 1042 and/or other input controller(s) 1044. The touch-surface controller 1042 can be coupled to a touch surface 1046. The touch surface 1046 and touch-surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1046.

The other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of the speaker 1028 and/or the microphone 1030.

In one implementation, a pressing of the button for a first duration can disengage a lock of the touch surface 1046; and a pressing of the button for a second duration that is longer than the first duration can turn power to the computing device 1000 on or off. Pressing the button for a third duration can activate a voice control, or voice command, module that enables the user to speak commands into the microphone 1030 to cause the device to execute the spoken command. The user can customize a functionality of one or more of the buttons. The touch surface 1046 can, for example, also be used to implement virtual or soft buttons and/or a keyboard.

In some implementations, the computing device 1000 can present recorded audio and/or video files, such as MP3, AAC, and MPEG files. In some implementations, the computing device 1000 can include the functionality of an MP3 player, such as an iPod™. The computing device 1000 can, therefore, include a 36-pin connector that is compatible with the iPod. Other input/output and control devices can also be used.

The memory interface 1002 can be coupled to memory 1050. The memory 1050 can include high-speed random access memory and/or non-volatile memory, such as one or more magnetic disk storage devices, one or more optical storage devices, and/or flash memory (e.g., NAND, NOR). The memory 1050 can store an operating system 1052, such as Darwin, RTXC, LINUX, UNIX, OS X, WINDOWS, or an embedded operating system such as VxWorks.

The operating system 1052 can include instructions for handling basic system services and for performing hardware dependent tasks. In some implementations, the operating system 1052 can be a kernel (e.g., UNIX kernel). In some implementations, the operating system 1052 can include instructions for performing voice authentication. For example, operating system 1052 can implement the moments naming features as described with reference to FIGS. 1-9.

The memory 1050 can also store communication instructions 1054 to facilitate communicating with one or more additional devices, one or more computers and/or one or more servers. The memory 1050 can include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GNSS/Navigation instructions 1068 to facilitate GNSS and navigation-related processes and instructions; and/or camera instructions 1070 to facilitate camera-related processes and functions.

The memory 1050 can store other software instructions 1072 to facilitate other processes and functions, such as the moments naming processes and functions as described with reference to FIGS. 1-9.

The memory 1050 can also store other software instructions 1074, such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions of the computing device 1000 can be implemented in hardware and/or in software, including in one or more signal processing and/or application specific integrated circuits.

What is claimed is:

1. A method implemented using a computing device, the computing device comprising a camera device, a display, and one or more processors, the method comprising:
   generating, by the computing device, a time-based grouping of images captured by the camera device;
   obtaining, by the computing device, a geographic location estimate from metadata generated by the camera device for an image in the grouping of images;
   obtaining, by the computing device, a list of location strings corresponding to the geographic location estimate;
   obtaining, by the computing device, an accuracy metric for the geographic location estimate from the metadata of the image;
   determining, by the computing device, an accuracy of the geographic location estimate by the accuracy metric;
   filtering out, by the computing device, one or more location strings that fail to satisfy the accuracy metric to determine a name for the image;
   assigning, by the computing device, the name to the time-based grouping of images based on at least one location string that satisfies the accuracy metric; and
   displaying, by the computing device, the name on the display in association with the time-based grouping of images.

2. The method of claim 1, further comprising:
   determining, by the computing device, two or more images from a plurality of images that were captured within a threshold period of time; and
   generating, by the computing device, the time-based grouping of images based on the determined images.

3. The method of claim 1, further comprising:
   obtaining, by the computing device, a geographic location for the image from metadata corresponding to the image, the geographic location corresponding to a device-determined location.

4. The method of claim 1, wherein the geographic location and the accuracy metric are obtained from metadata corresponding to the image.

5. The method of claim 1, further comprising:
   determining, by a location sensor of the computing device, a current geographic location of the computing device;
   determining, by the computing device, an accuracy metric for the determined current geographic location; and
   storing, by the computing device, the current geographic location and the accuracy metric as metadata for the image.

6. The method of claim 1, further comprising:
   presenting, on a display of the computing device, a map graphical user interface representing a geographical area, where the geographical area is determined based on a zoom level;
   receiving, by the computing device, user input selecting a geographic location within the geographical area;
   determining, by the computing device, an accuracy metric for the geographic location based on the zoom level; and
   storing, by the computing device, the selected geographic location and the accuracy metric as metadata for the image.

7. The method of claim 1, wherein the list of location strings is a hierarchical list of location strings corresponding to different geographic levels, and further comprising filtering the hierarchical list of location strings at a geographic level corresponding to the accuracy metric.

8. A non-transitory computer-readable medium including one or more sequences of instructions that, when executed by one or more processors, causes:
   generating, by the computing device, a time-based grouping of images captured by the camera device;
   obtaining, by the computing device, a geographic location estimate from metadata generated by the camera device for an image in the grouping of images;
   obtaining, by the computing device, a list of location strings corresponding to the geographic location estimate;
   obtaining, by the computing device, an accuracy metric for the geographic location estimate from the metadata of the image;
   determining, by the computing device, an accuracy of the geographic location estimate by the accuracy metric;
   filtering out, by the computing device, one or more location strings that fail to satisfy the accuracy metric to determine a name for the image;
   assigning, by the computing device, the name to the time-based grouping of images based on at least one location string that satisfies the accuracy metric; and
   displaying, by the computing device, the name on the display in association with the time-based grouping of images.

9. The non-transitory computer-readable medium of claim 8, wherein the instructions cause:
   determining, by the computing device, two or more images from a plurality of images that were captured within a threshold period of time; and
   generating, by the computing device, the time-based grouping of images based on the determined images.

10. The non-transitory computer-readable medium of claim 8, wherein the instructions cause:
    obtaining, by the computing device, a geographic location for the image from metadata corresponding to the image, the geographic location corresponding to a device-determined location.

11. The non-transitory computer-readable medium of claim 8, wherein the geographic location and the accuracy metric are obtained from metadata corresponding to the image.

12. The non-transitory computer-readable medium of claim 8, wherein the instructions cause:
    determining, by a location sensor of the computing device, a current geographic location of the computing device;
    determining, by the computing device, an accuracy metric for the determined current geographic location; and
    storing, by the computing device, the current geographic location and the accuracy metric as metadata for the image.

13. The non-transitory computer-readable medium of claim 8, wherein the instructions cause:
    presenting, on a display of the computing device, a map graphical user interface representing a geographical area, where the geographical area is determined based on a zoom level;
    receiving, by the computing device, user input selecting a geographic location within the geographical area;
    determining, by the computing device, an accuracy metric for the geographic location based on the zoom level; and
    storing, by the computing device, the selected geographic location and the accuracy metric as metadata for the image.

14. The non-transitory computer-readable medium of claim 8, wherein the list of location strings is a hierarchical list of location strings corresponding to different geographic levels, and wherein the instructions cause filtering the hierarchical list of location strings at a geographic level corresponding to the accuracy metric.

15. A computing device comprising:
a camera device;
a display device;
one or more processors; and
a computer-readable medium including one or more sequences of instructions that, when executed by the one or more processors, causes:
generating, by the computing device, a time-based grouping of images captured by the camera device;
obtaining, by the computing device, a geographic location estimate from metadata generated by the camera device for an image in the grouping of images;
obtaining, by the computing device, a list of location strings corresponding to the geographic location estimate;
obtaining, by the computing device, an accuracy metric for the geographic location estimate from the metadata of the image;
determining, by the computing device, an accuracy of the geographic location estimate by the accuracy metric;
filtering out, by the computing device, one or more location strings that fail to satisfy the accuracy metric to determine a name for the image;
assigning, by the computing device, the name to the time-based grouping of images based on at least one location string that satisfies the accuracy metric; and
displaying, by the computing device, the name on the display in association with the time-based grouping of images.

16. The computing device of claim 15, wherein the instructions cause:
determining, by the computing device, two or more images from a plurality of images that were captured within a threshold period of time; and
generating, by the computing device, the time-based grouping of images based on the determined images.

17. The computing device of claim 15, wherein the instructions cause:
obtaining, by the computing device, a geographic location for the image from metadata corresponding to the image, the geographic location corresponding to a device-determined location.

18. The computing device of claim 15, wherein the geographic location and the accuracy metric are obtained from metadata corresponding to the image.

19. The computing device of claim 15, wherein the instructions cause:
determining, by a location sensor of the computing device, a current geographic location of the computing device;
determining, by the computing device, an accuracy metric for the determined current geographic location; and
storing, by the computing device, the current geographic location and the accuracy metric as metadata for the image.

20. The computing device of claim 15, wherein the instructions cause:
presenting, on a display of the computing device, a map graphical user interface representing a geographical area, where the geographical area is determined based on a zoom level;
receiving, by the computing device, user input selecting a geographic location within the geographical area;
determining, by the computing device, an accuracy metric for the geographic location based on the zoom level; and
storing, by the computing device, the selected geographic location and the accuracy metric as metadata for the image.

21. The computing device of claim 15, wherein the list of location strings is a hierarchical list of location strings corresponding to different geographic levels, and wherein the instructions cause filtering the hierarchical list of location strings at a geographic level corresponding to the accuracy metric.

* * * * *